United States Patent Office 2,991,279
Patented July 4, 1961

2,991,279
TREATMENT OF OLEFIN POLYMERS
Floyd F. Miller, Wadsworth, and David S. Conner, Avon Lake, Ohio, assignors to Goodrich-Gulf Chemicals, Inc., Cleveland, Ohio, a corporation of Delaware
No Drawing. Filed Aug. 7, 1956, Ser. No. 602,492
3 Claims. (Cl. 260—94.7)

The present invention relates to the treatment of reaction mixtures containing an olefinic hydrocarbon polymer. More specifically, the invention relates to the treatment of reaction mixtures containing dissolved hydrocarbon polymers, partially dissolved hydrocarbon polymers or solvent-swollen, solid hydrocarbon polymers in order to recover a solid polymer therefrom in an essentially solvent-free condition.

There are a number of solvent-type polymerization processes which produce olefinic hydrocarbon polymers which are either completely soluble, partially soluble, or at least highly swollen, by the polymerization solvent medium and/or residual unreacted monomers. Where the polymer is completely soluble the polymer can be recovered by coagulation or precipitation, by distillation of the solvent or by air- or vacuum-drying. Of these methods, coagulation is by far the most economical. Where the reaction mixture contains highly solvated solid polymer handling of such mixtures is very difficult due to the sticky, soft condition of the polymer.

Coagulation of polymer/solvent solutions, or hardening of slurried crumbs of solvated polymer, can be brought about by intermixture of the polymer with a non-solvent such as an alcohol. However, aggregation of the precipitated, solvent-swollen polymer frequently occurs with the production of large polymer masses which are difficult to handle and dry. Slurries of swollen or solvated solid polymer, on intermixture with a non-solvent, frequently are badly aggregated.

In the copending application of Floyd F. Miller and Albert E. Ekar, Serial No. 555,299, filed December 27, 1955, there is disclosed a method of controllably coagulating olefinic hydrocarbon polymer solutions by adding the polymer solution to a mixed solvent/alcohol solution to produce a slurry of hardened crumbs which is more easily handled on conventional equipment. Such a method relies primarily on the composition of the coagulating bath to throw the polymer out of solution in a fine state of division and to control the rate at which the fine particles coalesce to form discrete crumbs. Slurries of solvated solid polymer can also be hardened by this process.

In a system wherein benzene is the solvent, methanol is the alcohol, and an all cis-1,4 polyisoprene is the polymer, the mixed coagulating solution referred to above preferably will contain 2 to 3 volumes of benzene for every volume of methanol. Thus it can be seen that a very large volume of benzene is required which must be effectively recovered for reuse in order to hold porcessing costs within reason. Frequently the volume of benzene required for coagulation will be equal to, or even double or triple, that employed in the polymerization reaction.

Likewise, a very large volume of alcohol is required and must be separated from the solvent by a multi-step solvent recovery process. These coagulation processes, even that of the copending application, produce a polymer crumb which contains so high a proportion of solvent that solvent losses and solvent recovery costs are excessive. Moreover, the slurry crumbs thus obtained contain 4 to 5 times their own weight of benzene and are therefore difficult to dry in an economical manner.

Solvent-saturated crumbs of hydrocarbon type polymers tenaciously retain their hydrocarbon solvent content. On the other hand, these same polymers, when saturated with a non-solvent, particularly a non-hydrocarbon type material such as an alcohol, readily give up the non-solvent. They do so, so readily in fact, that the non-solvent in many cases can be expelled merely by squeezing the polymer. It is obvious, therefore, that the cost of production of the hydrocarbon polymer could be greatly reduced if (1) the solvent/lb. of polymer and non-solvent/lb. of polymer processing ratios can be reduced, (2) by producing a crumb very low in solvent content, and (3) by making possible the use of conventional synthetic rubber processing equipment.

According to this invention, these and other objects are attained in a process whereby the polymer solution or slurry is brought into contact with an alcohol at a temperature in excess of 45° C. under conditions of good agitation. Pure alcohols can be employed and mixed alcohol/solvent solutions high in alcohol content may likewise be employed. In each case a solid polymer is obtained in the form of hardened, essentially non-sticky crumb. Large aggregates or lumps of polymer are avoided such that the slurry-like coagulation medium can be pumped and screened to separate polymer from liquid. Due to the high proportion of alcohol present the screened crumbs contain less solvent (the crumbs, therefore, are deswolen and occupy less volume) and are easier to dry. As a result far reaching economies are possible not only on polymer drying costs, but also on dryer capacity, solvent and alcohol losses and on solvent and alcohol recovery costs.

Because the warm alcohol medium has little tendency to agglomerate the polymer crumbs the warm solvent/alcohol slurries can be treated to still further reduce its solvent content before the crumb is separated from the liquor. For example, in the slurry after precipitation has just occurred the crumbs are highly swollen. Addition of 5 or 10 percent additional alcohol (at above 45° C.) causes as much as 50 percent or more shrinkage in the volume occupied by the crumbs. This is due to removal of dissolved solvent. At this point the slurry is easier to stir. Alternatively, the freshly coagulated slurry can be heated to distill off a solvent/alcohol azeotrope and thus effect an increase in alcohol concentration, shrink and harden the crumbs and produce a more easily dried crumb. Azeotropic distillation accompanied by replacement of lost volume by pure alcohol will eventually produce a slurry of polymer in essentially pure alcohol. A similar result is obtained with another procedure wherein one begins to siphon off or decant slurry liquor as soon as precipitation is complete while adding alcohol to replace lost volume. The alcohol-saturated crumbs resulting from any of these procedures will remain discrete at temperatures above 45° C. and can be freed of alcohol by filtration followed by squeezing or drying or by extracting out the alcohol with water and drying the resulting water-wetted polymer.

The alcohol employed should be miscible with the hydrocarbon solvent of the polymer solution or slurry. Illustrative alcohols include methanol, ethanol, isopropanol, butanol, and other lower aliphatic monohydric alcohols; ethylene glycol and other aliphatic polyhydric alcohols; cycloheptanol and other alicyclic monohydric alcohols; and benzyl alcohol and other aromatic type alcohols. The lower aliphatic monohydric alcohols from methanol to the butanols are preferred. Where methanol is miscible with the particular solvent it is the most preferred.

The method of this invention can be utilized to recover any hydrocarbon polymer from its solutions or slurries in hydrocarbon solvent and in fact from any solution containing hydrocarbon-solvated polymer. Thus open-chain, aliphatic conjugated dienes such as isoprene or butadiene polymerize in aliphatic and aromatic solvents to produce viscous solutions of gel-free, high molecular weight polymers easily susceptible of treatment by the warm or hot alcohol method of this invention. Likewise, some of the 1-monoolefinic hydrocarbon such as 1-butene, isobutylene, 1-pentene, 1-octene, and others, homopolymerize or copolymerize with dienes to form soluble polymers whose solution can be coagulated with hot alcohol.

The above and other 1-olefinic hydrocarbon monomers, that is, monomers containing at least one $CH_2=C<$ grouping per molecule, are polymerized in solvent by the alkali metal catalysts, particularly lithium metal, alkyl lithium compounds and lithium "alfin" catalysts, and by certain heavy metal organometallic catalysts to be defined below. With certain of the latter catalysts, open-chain aliphatic conjugated dienes can be polymerized at high solvent dilutions to an essentially all-1,4 polymer (that is, virtually no 1, 2 and 3-4 structural units are present in its structure) which is obtained as a viscous solution. Likewise, these same catalysts can be employed to polymerize isoprene in butane to produce a slurry of gel-like particles which can be handled by the hot alcohol method. Thus, there may be employed 1-monoolefinic hydrocarbons such as those above including in addition styrene, cycloheptene, and others; any open-chain conjugated aliphatic diene; any alicyclic diene such as cyclopentadiene-1,3, cyclohexadiene-1,3, cycloheptadiene-1,3, and others; and mixtures of one or more of these and other 1-olefinic hydrocarbons with or without non-conjugated polyolefin hydrocarbons such as allene, diallyl, dimethallyl, propyl allene, squalene, 1-vinyl-cyclohexene-3, and others.

By the term "1-monoolefinic hydrocarbon monomer" is meant any unsaturated hydrocarbon of the above types having at least one $CH_2=C<$ group per molecule and which does not produce an insoluble, cross-linked polymer.

The most preferred catalysts, because they operate better at high solvent/monomer ratios, are the above-mentioned "heavy metal organometallic catalysts." The latter also are effectively destroyed and extracted by hot alcohol. These catalysts are made up of metal atoms connected to radicals capable of joining to metal atoms in organometallic compounds, at least one of such radicals being an organic radical connected to a metal atom through a carbon atom, and at least one of the metal atoms being a heavy metal occurring in the 4th and 10th positions of the long periods of the periodic arrangement of the elements in short and long periods (as shown on page 342, Handbook of Chemistry and Physics, 33rd edition, published by Chemical Rubber Publishing Co., Cleveland, Ohio, 1952).

In this definition of the catalyst the term "radicals capable of joining to metal atoms in organometallic compounds" includes (1) organic radicals capable of linking to metal through carbon such as alkyl radicals, aryl radicals, cycloalkyl radicals, and other hydrocarbon radicals, (2) oxy-hydrocarbon radicals such as alkoxy radicals, aroxy radicals, etc., (3) organic salt-forming radicals such as the acetyl-acetone radical, the oxalate radical, etc., (4) inorganic salt-forming radicals such as the halogen atoms (fluorine, chlorine, bromine, and iodine) as well as oxyhalide radicals, etc., and (5) hydrogen atoms. The term "heavy metal occurring in the 4th to 10th positions of the long periods of the periodic arrangement of elements in short and long periods" includes the metals of groups IIB, VB, VIB, VIIB and VIII including titanium, zirconium, hafnium, vanadium, niobium (columbium), tantalum, chromium, molybdenum, tungsten, manganese, technetium, rhenium, iron, cobalt, nickel, ruthenium, rhodium, palladium, osmium, iridium, and platinum as well as metals in the corresponding positions in the last long period in the so-called "actinium series" such as thorium and uranium.

The above definition of catalyst which are useful in the preparation of polymer containing solutions and slurries amenable to treatment by the method of this invention include catalysts which are made up of a single organometallic compound having as its metallic portion a heavy metal atom of the group set forth, which heavy metal atom is connected by at least one of its valences to a carbon atom of an organic radical, and it also includes catalysts made by bringing together a plurality of chemical compounds, one of which may be an organometallic compound in which a carbon atom of an organic group is attached to a metal atom other than a heavy metal atom of the group set forth, for example, an alkali metal such as sodium, potassium or lithium; an alkaline earth metal such as barium, calcium or strontium, or magnesium; aluminum; zinc; a rare earth metal; tin; lead; or some other metal; and another of which may be a simple compound of the heavy metal such as a salt of the types set forth, the two types of metal compounds each having the metal atoms connected only to radicals of the type set forth above. There is also included catalysts formed by reacting the heavy metal in activated form with an olefinic compound (which may be the same as the later polymerized) which provides the organic radical linked by carbon to the heavy metal atom. These and other types of catalysts are described in greater detail in the copending applications, Serial No. 472,786, filed December 2, 1954, and Serial No. 503,027, filed April 21, 1955.

The preferred catalysts are those prepared by reacting (1) an organometallic "alkyl donor" substance such as an alkyl aluminum compound or an alkyl tin compound, (2) a heavy metal compound selected from the class consisting of the titanium and vanadium tetrahalides, and, optionally, (3) a metallic halide donor compound such as an aluminum trihalide, alkyl aluminum halide, boron trifluoride, and many others. Thus, as alkyl aluminum compounds there may be utilized trimethyl aluminum, dimethyl aluminum chloride, triethyl aluminum, diethyl aluminum chloride, diethyl aluminum bromide, ethyl aluminum dibromide, triisobutyl aluminum, diisobutyl aluminum chloride, diisobutyl aluminum fluoride, trioctyl aluminum and many others; as alkyl tin compounds then may be utilized tin tetraethyl, tin tetrabutyl and many others; and as a halide donor an aluminum halide $R_n—AL—X_{3-n}$ type compounds wherein R is an organic radical and $n$ is an integer from 0 to 2 including aluminum trichloride or tribromide, diethyl aluminum sesquibromide (a mixture of the mono- and dibromides), and many others; and as a titanium or vanadium tetrahalide there may be utilized titanium tetrachloride, titanium tetrabromide, titanium tetrafluoride, vanadium tetrachloride and the like. Much preferred for the directive polymerization of isoprene, butadiene, etc. to produce essentially all-1,4 polymers are combinations of (1) a trialkyl aluminum compound and (2) titanium tetrachloride or vanadium tetrachloride. The use of such catalysts to produce essentially all-1,4 diene polymers is more fully disclosed in copending applications, Serial No. 503,027, filed April 21, 1955; Serial No. 472,786, filed December 2, 1954; and Serial No. 503,028, filed April 21, 1955.

The reaction between (1) the preferred alkyl aluminum and (2) titanium tetrahcloride or vanadium tetrachloride may be carried out, for example, by adding triisobutyl aluminum to purified benzene or heptane at room temperature, while maintaining an inert atmosphere thereover, followed by adding the titanium or vanadium compound. In order to exclude substantial amounts of air, moisture, etc. an inert atmosphere of nitrogen, argon, helium or hydrocarbon vapors are maintained over the catalyst during catalyst preparation and during the polymerization. The preferred catalysts are, in many cases, dark colored and contain a reddish-brown to black, difficultly-soluble precipitate. The resulting catalyst solution is then diluted to the desired concentration and the monomeric hydrocarbon added while the reaction mixture is cooled to hold the temperature below about 80° C., preferably between about −25 and about 60° C. After polymerization is complete the reaction mixture is conducted into warmed alcohol as described herein.

Polymer solutions and slurries containing heavy metal organometallic catalysts should be protected from oxygen prior to and during their addition to alcohol in order to prevent insolubilization of the catalyst and its residues. Where, however, the polymerization mixture is first treated with alcohol, amines, deoxygenated water, and other additives which deactivate and extract the catalyst, the addition to alcohol can be performed in the presence of the atmosphere.

The polymer reaction mixture containing solvated polymer can be brought into contact with the warm alcohol at any temperature in excess of 45° C., although in most cases there is little advantage in operating above the boiling point of the alcohol or of the solvent/alcohol mixture since pressure-type equipment would be required. If the particular solvent and particular alcohol form an azeotrope boiling above 45° C. then such azetropic boiling point or just slightly below is a convenient temperature at which to operate since the coagulation can be carried out in a condenser-equipped vessel so that the azeotrope may be removed to strip off the solvent added in the polymer solution or slurry. An example of this mode of operation is with benzene and methanol which form (at atmospheric pressure) an azeotrope of approximately 60 percent benzene and 40 percent methanol boiling at about 57° C. The addition of a benzene polymer solution to methanol maintained at about 50 to 55° C. or vice versa and, after the precipitation is complete, followed by distillation while replacing lost volume with methanol produces a slurry of hardened, benzene-free crumbs in essentially pure alcohol.

If the alcohol and solvent employed form an azeotrope which boils at too high a temperature, distillation at moderately reduced pressures usually will effect a marked reduction in the azeotropic boiling point. The combination of heptane and ethanol is an instance of the latter situation wherein the azeotrope (51% heptane/49% etahanol) boils at about 71° C. Moderately reduced pressures easily reduce this boinling point to 50 to 60° C. Suitable combinations of a solvent and an alcohol producing solvent-rich, low-boiling azeotropes are hexane/methanol which form an azeotrope of 72% hexane and 28% methanol boiling at about 50.6° C., toluene/methanol which form an azeotrope of 31 percent toluene and 69 percent methanol boiling at about 63.8° C.; heptane/methanol which forms an azeotrope of 48.5 percent heptane and 51.5 percent methanol boiling at about 59° C.; pentane/methanol which forms an azeotrope of 91 percent pentane and 9 percent methanol boiling at about 30.8° C.; and many others. Low boiling solvents, such as butane, which do not form an azeotrope with most common alcohols, can be flashed off from a hot alcohol coagulation mixture as essentially pure hydrocarbon, thus greatly simplifying solvent and alcohol recovery operations.

Contact between the polymer solution or slurry and the alcohol can be effected by adding the polymer solution to the alcohol, or vice versa. On a large scale it is perhaps better to add the alcohol to the polymer solution because (1) agitation is less efficient and (2) the first additions of alcohol greatly reduce the viscosity of polymer solutions. Where a solution or slurry of polymer is being intermixed with an essentially pure alcohol, intermixing can be effectively performed in a centrifugal pump equipped with concentric inlet pipes (arranged to discharge separate streams of polymer solution and alcohol directly into the vortex of the pump) with the discharge of the pump arranged to deliver the efficiently intermingled streams into a hold-up tank where it is agitated for awhile to allow time for solvent extraction and hardening of the crumbs.

An optional mode of procedure for operation below the azeotropic boiling point is to add the benzene polymer solution in a continuous stream to benzene/methanol mixtures while simultaneously withdrawing coagulation liquor and adding methanol. After coagulation occurs continued withdrawal of liquor and addition of methanol lowers the overall concentration of benzene and produces an essentially alcohol-saturated polymer crumb. Of course, the benzene polymer solution can be added to a quantity of essentially pure methanol sufficiently large to produce a low final benzene concentration. Azeotropic distillation of the solvent/alcohol azeotrope is the preferred method. In fact azeotropic distillation of benzene/methanol or other solvent-alcohol solution can be employed to treat coagulation mixtures prepared by any coagulation procedure, for example, that shown in copending application Serial No. 555,299.

Following the coagulation or slurry-hardening step the polymer is separated from the alcohol by filtration, screening or decantation and the polymers treated to remove residual alcohol. The latter step can be carried out in a solvent drier or in a vacuum drier, or it can be accomplished by squeezing the polymer by passing the crumbs through an extruder or through squeeze rolls. The product in any case is a dry crumb which can be employed as such or compacted by milling, granulating, etc. Antioxidants and the like can be added to the extruder, squeeze rolls or compacting mill.

The invention will now be described with reference to several specific examples which are intended as being illustrative only.

*Example 1*

In this example there is prepared a solution in benzene of an essentially all cis-1,4 polyisoprene, the polymer being prepared according to the process of copending application Serial No. 472,786. The polymerization is carried out in a sealed autoclave which is first cleaned, dried and flushed with dry $O_2$-free nitrogen before about 5 to 10 percent of the total benzene charge is added thereto. Sufficient triisobutyl aluminum is added next, followed by the addition of about 6.7 millimoles of $TiCl_4$ per liter of solvent in the final charge, to produce a Ti/Al ratio of 0.85:1. Upon addition of the $TiCl_4$ the solution turns dark brown and a reddish brown precipitate forms. The remainder of the benzene is then added and about 10 percent by volume on the benzene of isoprene is pressured in. Reaction is carried out at about 5° C. to produce a very dark brown, very viscous cement containing 6 to 8 percent by weight of all cis-1,4 polyisoprene.

A 388 gram portion of the above cement is drained through a tube into a nitrogen-filled flask containing about 1 liter of deoxygenated water which has been boiled, degassed and stored under nitrogen. The brown color of the cement soon disappears after a few minutes agitation. After about 20 minutes of mixing the mixture is allowed to stand until separation of phases occurs. The flask then contains (1) an upper layer of clear, colorless benzene cement and (2) a lower layer of a deep blue aqueous catalyst extract. The latter is withdrawn through the bottom of the flask and the remaining cement layer is washed with two successive 500 ml. portions of deoxygenated water. The clear, colorless benzene cement remaining in the flask after the third extract is found to contain less than 0.08 percent of inorganic residue.

The cement is then thinned with 30 ml. of pure methanol and heat is applied to heat the flask contents to about 57° C. The addition of pure methanol is then commenced at a slightly slower rate than that at which distillate is withdrawn through a water-cooled condenser. The first distillate consists of about 60 percent by volume benzene and 40 percent by volume of methanol. The mixture soon develops spontaneously a precipitate in the form of tight, small crumbs of polyisoprene. Distillation is continued while the lost volume is replaced with pure methanol. When the boiling point indicates that the distillate contains less than 1 to 2 percent by volume of benzene the distillation and addition of methanol are terminated. The product is a slurry of fine, discrete, non-tacky crumbs in essentially pure methanol. Crumbs made in this fashion contain very little benzene and are essentially saturated with methanol. Crumbs such as these are dried by four passes through an extruder wherein the barrel and screw are heated to 180–200° F. The crumbs dried in this fashion are not stabilized by antioxidant in order to determine the amount of breakdown suffered by such working under elevated temperatures. The heat loss and intrinsic viscosity (after each pass) data are as follows:

| Pass Number | Percent Heat Loss | Intrinsic Viscosity |
|---|---|---|
| 0 | 49.6 | 2.78 |
| 1 | 15.2 | 2.72 |
| 2 | 7.5 | 2.58 |
| 3 | 3.6 | 2.52 |
| 4 | 2.2 | 2.38 |

Polymer crumbs, properly stabilized, would not suffer appreciable breakdown under the above conditions. On a larger scale, with commercial equipment, a crumb containing less than about 1 percent alcohol is obtained by this procedure.

*Example II*

A water-extracted cement of all cis-1,4 polyisoprene similar to that of Example I is utilized in this example. About 143 grams of cement is placed in a flask under nitrogen (i.e. never exposed to air) and about 50 ml. of methanol added slowly with stirring. The solution thins down considerably. Heat is then applied while continuing to stir the solution. When the liquid temperature reaches about 57° C. distillate starts coming over through the condenser. While the first 40 ml. of distillate is being collected about 30 ml. of pure methanol are added. At this latter point a soft, definite crumb begins to form. Distillation is continued while the lost volume is replaced with pure methanol until a point is reached, as indicated by rise in vapor temperature, that the slurry liquor contains less than about 2 or 3 percent benzene.

Water is then added and methanol is taken off overhead. Addition of water and stripping is continued until nearly all the methanol is recovered. At the conclusion of this step the product is a slurry of hard crumbs in essentially pure water. This slurry is then poured onto a screen and allowed to drain. The crumbs are then dried in a vacuum drier at 50° C. The ash content of the resulting dried crumbs is below the limits of accuracy of the ashing weight loss method.

*Example III*

The procedure of Example II is repeated by first centrifuging 183 grams of a cement similar to that of Examples I and II. This procedure removes 14 ml. of water from the water-extracted benzene cement. About 153 grams of the dewatered cement are placed in a flask under nitrogen. Heat is then applied. The cement is still too viscous to stir at 50° C. so 10 ml. of pure methanol are added. The cement then becomes quite fluid. At this point 0.06 gram of sym.-di-beta-naphthyl-para-phenylenediamine and 0.03 gram of diphenylpara-phenylenediamine are added in benzene/methanol dispersion. The cement is then heated to boiling and methanol is added thereto in 1–2 ml. increments as distillation progresses to maintain fluidity. After a while the flask and its contents are allowed to cool and it is observed that the cement separates into (1) an upper cement phase and (2) a lower benzene/methanol phase. Heat is reapplied and distillation is continued while adding methanol at a rate lower than the rate of distillation. When ⅔ of the original benzene has been recovered a dry, non-tacky crumb is formed. A total volume of 300 ml. of methanol is added and a total of 306 ml. of distillate is collected. The distillate composition is as follows:

| Cut: | $n_D^{25}$ |
|---|---|
| 0–202 ml. | 1.4220 |
| 202–203 ml. | 1.3768 |
| 303–306 ml. | 1.3281 |

An equal volume of water is then added and distillation is continued until the vapor temperature reaches 98.5° C. At this point most of the methanol has been recovered. The benzene/methanol distillate is scrubbed with water, the resulting water/methanol extract combined with the methanol/water distillate and the methanol recovered therefrom by stripping. The water scrubbed benzene is distilled to obtain a dry benzene which can be recycled to the polymerizer. The recovered methanol is recycled to the coagulation process.

*Example IV*

In this example, a benzene/polyisoprene cement containing about 6.8 percent polyisoprene is prepared as described in Example I. The catalyst in the cement is destroyed by the addition of a slight stoichiometrical excess of triethanolamine. The cement can then be exposed to air. About 183 grams are placed in a flask and heated to about 40° C. At the latter point the addition of methanol is commenced at a fast rate while continuing to apply heat. By the time the temperature reaches 57° C. 130 ml. of methanol has been added in a period of only 5½ minutes. Distillation then begins while the addition of methanol is continued at the same rate as before. When a total of 193 ml. of methanol has been added, crumbs begin to form. At this point the slurry contains 58 percent benzene and the addition of methanol is terminated temporarily while continuing to take off distillate. When a total of 200 ml. of distillate has been collected 25 ml. of methanol is added in one shot. When 250 ml. of distillate has collected a total of 250 ml. of methanol has been added. Water is then added and the methanol is stripped out. The total procedure consumes only 40 minutes. The aqueous slurry of crumbs is screened and the crumbs found to have no detectable odor of benzene. Finally, the crumbs are dried in a vacuum drier. The product is a soft, plastic rubbery material of excellent properties when vulcanized.

*Example V*

The polymer solution utilized in this case is similar to that of Example I. In this case the polymer is not treated with water but is stored under nitrogen and used as such in the coagulation procedure. A 925 gram portion of the cement is placed in a flask under nitrogen and heat is applied. When the temperature of the cement reaches about 50° C. the rate of heating is reduced to hold the temperature at about 50° C. Addition of methanol is then commenced in a small continuous stream while rapidly agitating the polymer solution. The first addition of methanol causes the cement to thin appreciably so that agitation is much more effective. Such a thinning action is not nearly as pronounced at room temperature. Methanol addition is continued until about 300 ml. have been added. At about this point a very fine, discrete but highly solvated crumb (about ¹⁄₁₆″ or less in diameter) forms. Addition of methanol is then resumed and the rate of heating increased. When only 30 to 50 ml. of additional methanol has been added, it is observed that the volume of crumbs has shrunk to one-half and agitation is improved. This shrinkage is not accompanied by increase in crumb size. When the slurry temperature reaches about 57° C. distillation commences, the distillate being taken off through a water-cooled condenser. The first condensate is found to contain 58 to 60 percent benzene. Distillation is continued while replacing lost volume with pure methanol until the vapor temperature rises to essentially that of pure methanol, thus indicating the benzene content of the slurry is less than about 1 percent. A total of about 3000 ml. of condensate is thus collected and about an equal volume of methanol has been added. The slurry at this point contains very fine (1/16") crumbs which are hard, firm and occupy still less volume than at the intermediate point noted above. The slurry is then screened and the crumbs dried in an extruder. The resulting all cis-1,4 polyisoprene is low in ash content and vulcanizes to have excellent properties.

A variation of the above procedure consists in precipitating with methanol at 50° C., adding a 5 to 10 percent excess of methanol (i.e. above the minimum required for preciptation) to bring about the above-noted 50 percent shrinkage in crumb volume, separate the already partially-hardened crumbs from the liquor and then dry the resulting crumb which contains a greatly reduced benzene content. Although drying costs would be higher, the latter would be compensated for by the reduced amount of alcohol required.

A still further variation of the first procedure of Example V is to reslurry the crumbs (screened from the completely distilled slurry) in pure methanol, screen again and then dry. A still further reduction in ash content is noted.

Example VI

In this case a 900 gram portion of a polyisoprene cement in benzene, as obtained from the polymerization, is placed in a coagulation flask flushed with nitrogen. While stirring the cement heat is applied and the addition of methanol is commenced at a rapid rate. When the temperature reaches 50° C. the rate of heating is reduced to hold the flask contents at that temperature. The addition of methanol is continued until coagulation occurs, at which point the liquor is withdrawn at about the same rate as methanol is added. This procedure is continued until the benzene content of the liquor is below about 5 percent. The product is a slurry of hard, fine crumbs in essentially pure methanol. The slurry is discharged hot and then poured through a screen. The drained crumbs are then reslurried several times in pure methanol. After the final screening the crumbs are dried in a vacuum oven. The ash content of the dried polymer is very low. When this decantation type procedure is attempted at room temperature, a solid mass of polymer suddenly forms in the solution when the methanol content reaches about 50 percent by volume.

Example VII

An all cis-1,4 polyisoprene is prepared in hexane using a triisobutyl aluminum titanium tetrachloride catalyst similar to that of Example I. The product is a viscous solution to which methanol is added while applying heat. At about 50° C. an azeotrope of hexane/methanol begins to distill out of the flask, which azeotrope contains 70-72 percent hexane and 28-30 percent methanol. Distillation is continued while the lost volume is replaced with methanol. Since the hexane content is rapidly depleted coagulation occurs quite soon and with smaller amounts of methanol. Continued distillation while adding methanol produces a slurry of crumbs in essentially pure methanol. The crubs are hard, non-sticky and easily screened. The screened polymer is very low in hexane content and is easily dried in 3 or 4 passes through an extruder.

Example VIII

An all trans-1,4 polybutadiene is prepared by polymerization in toluene using a triisobutyl aluminum/titanium catalyst at a Ti/Al ratio of 2:1 with a titanium concentration of about 20 millimoles per liter of toluene. After polymerization is complete methanol is added while applying heat. Methanol addition is continued (at about 50-55° C.) until precipitation occurs at a toluene/methanol ratio of about 2:1. Heating is then resumed. When the temperature reaches about 63-64° C. an azeotropic mixture consisting of 31 percent toluene and 69 percent methanol starts coming over and methanol addition is resumed to replace the lost volume. Addition of methanol and azeotropic distillation is continued until the toluene is substantially completely stripped out of the slurry. The crumbs are of fair to moderate size and evidence no tendency to agglomerate. At the conclusion of distillation they are hard and non-tacky. The polymer is then worked up as before. The dry polymer is low in ash content and has excellent vulcanized properties.

Example IX

In this example isoprene is polymerized in "instrument grade" n-butane to produce a slurry of 6 to 8 percent solids content of an essentially all cis-1,4 polyisoprene in butane. The polymer particles are highly gelatinous and are difficult to work up. The slurry is added slowly to pure methanol at 45° C. while rapidly agitating the latter. The butane flashes off and is taken off through a condenser where it is condensed for recycling purposes. Upon striking the alcohol the crumbs begin to lose their solvent swollen character. After the slurry addition is complete the mixture is agitated for a time to drive absorbed butane out of the polymer. The final mixture consists of a slurry of hard, discrete crumbs in pure methanol. The hot slurry is passed through a screen and the crumbs dried in a vacuum drier. The dried rubber is soft and has excellent properties when vulcanized. The dried polymer has a low ash content.

A second procedure for use with butane-type slurries results in better control of slurry particle size and reduced foaming during precipitation. This procedure comprises adding the butane slurry to warm alcohol (i.e. 45 to 50° C.), or vice versa, in a closed, pressure type vessel. This type of operation prevents vaporization of butane until after precipitation (of any dissolved polymer) and/or full hardening of solvated polymer is complete. Then the pressure may be released in a controlled manner through a cooled condenser (alcohol trap) and a Dry Ice cooled butane condenser. When all the butane has been vaporized a slurry of hard polymer particles in pure methanol is obtained. The latter is then worked up as described above. A practically quantitative recovery of polymerization grade butane can be recovered in this manner.

Example X

A copolymer of 80 percent by weight of n-pentene and 20 percent isoprene is prepared by polymerization in benzene using a triisobutyl aluminum:titanium tetrachloride catalyst similar to that of Example I. The isoprene is added to the catalyst solution and its polymerization carried to substantial completion. Then the n-pentene is added and polymerization is continued until a substantial proportion of n-pentene has reacted. The product of this style of polymerization is a very viscous solution free of solid polymer. When the n-pentene and isoprene are charged simultaneously the product consists of two phases, (1) a viscous solution of polymer and (2) an insoluble polymer fraction.

Both types of reaction mixtures are treated by placing the cement in a condenser equipped flask under nitrogen and adding methanol and applying heat. In the case of the completely soluble polymer, crumbs are formed shortly after distillation commences. In the case of the two-phase reaction mixture containing insoluble polymer the insoluble portions are hardened into discrete crumbs upon addition of a portion of the alcohol. Later, the soluble portion precipitates to form a slurry. In both cases the benzene is removed by azeotropic distillation. The alcohol-saturated crumbs are then dried in a vacuum oven.

*Example XI*

In this example a benzene cement of all cis-1,4 polyisoprene is thinned with an equal volume of benzene so as to be more easily pumped. A centrifugal pump is fitted with a pair of concentric inlet pipes connected to the centrally-located suction opening which connects with the central vortex of the paddle-wheel shaped impellor. The cement is forced through one of the concentric pipes and pure methanol heated to 60° C. is forced through the other of the concentric inlet pipes, the pump impellor being rotated so as to cause rapid and turbulent intermixing of the two streams. In order to reduce the hold-up time in the pump the pump is mounted above a hold-up/distillation vessel with the discharge opening of the pump arranged to discharge directly into the vessel. The hold-up/distillation vessel is equipped with a heating jacket and a water-cooled condenser. At the start of the run it is partially filled with methanol at a temperature of 50 to 60° C. The combined cement/methanol stream issuing from the pump seems to contain polymer coagulum. Coagulation is completed upon intermixture with the liquid in the disillation vessel. In each case after the cement addition is complete distillation is commenced and continued until an essentially benzene-free slurry is obtained. The polymer crumbs evidence little tendency to agglomerate. The polymer slurry is then screened hot and the polymer dried in an extruder. The product is a soft, rubbery material which has excellent vulcanized properties.

*Example XII*

In this example a benzene/polyisoprene cement similar to that of Example I is thinned with a small amount of methanol. While agitating the cement methanol is added slowly while the mixture is at 30 to 35° C. By the time one-third the volume of cement of methanol has been added a very fine, highly solvated crumb begins to form. As methanol addition is continued the crumbs become increasingly agglomerated so that by the time the liquor contains 50 percent methanol the polymer has coalesced to form a single mass of polymer that must be cut up by mechanical means. When, however, the temperature of the cement/alcohol mixture is maintained in the range of 45 to 50° C. agglomeration does not occur. After coagulation is complete the latter mixture is then heated to 57° C. to distill off the benzene/methanol azeotrope. The product is a slurry of crumbs in essentially pure methanol.

We claim:

1. The method of treating a solution containing a hydrocarbon solvent and a normally-solid polymer of an open-chain, aliphatic conjugated diene containing absorbed quanities of said solvent which comprises mixing said solution with an alcohol while maintaining the mixed material at a temperature in excess of 45° C. and up to 71° C., the proportion of said alcohol so mixed being sufficient to cause separation of said polymer in a discretely particulate crumb form suspended in a mixed hydrocarbon solvent/alcohol liquor, decanting said liquor from said crumbs while replacing the liquid volume with said alcohol, while maintaining the temperature of said crumbs in the range given above, and until the proportion of said hydrocarbon solvent in the remaining liquid is less than about 5% by volume, separating the crumbs from the said remaining liquid contents thereby to obtain said crumbs low in said hydrocarbon solvent and saturated with said alcohol, and squeezing said alcohol-saturated crumbs to reduce the alcohol content thereof.

2. The method as defined in claim 1 wherein said polymer is an essentially all-1,4 polyisoprene.

3. The method as defined in claim 1 wherein said polymer is an essentially all-1,4 polybutadiene.

References Cited in the file of this patent

UNITED STATES PATENTS

| | | |
|---|---|---|
| 2,624,726 | Serniuk | Jan. 6, 1953 |
| 2,683,139 | Leary et al. | July 6, 1954 |
| 2,728,758 | Field et al. | Dec. 27, 1955 |
| 2,813,136 | Mertz | Nov. 12, 1957 |
| 2,832,759 | Nowlin et al. | Apr. 29, 1958 |

FOREIGN PATENTS

| | | |
|---|---|---|
| 514,631 | Canada | July 12, 1955 |

OTHER REFERENCES

Gaylord et al.: Linear and Stereoregular Addition Polymers, Interscience Publishers, Inc., New York, 1959, pages 159 and 222.